United States Patent
Yun et al.

(10) Patent No.: US 9,392,305 B2
(45) Date of Patent: Jul. 12, 2016

(54) METHOD AND APPARATUS FOR PROVIDING ULTRA HIGH DEFINITION TELEVISION SERVICE

(71) Applicant: Electronics and Telecommunications Research Institute, Daejeon (KR)

(72) Inventors: Kug Jin Yun, Daejeon (KR); Won Sik Cheong, Daejeon (KR); Jin Young Lee, Seoul (KR); Gwang Soon Lee, Daejeon (KR); Nam Ho Hur, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/325,692

(22) Filed: Jul. 8, 2014

(65) Prior Publication Data

US 2015/0012958 A1 Jan. 8, 2015

(30) Foreign Application Priority Data

Jul. 8, 2013 (KR) .................. 10-2013-0079679
Jul. 16, 2013 (KR) .................. 10-2013-0083313
Jul. 1, 2014 (KR) .................. 10-2014-0081703

(51) Int. Cl.
*H04N 7/173* (2011.01)
*H04N 7/16* (2011.01)
*H04N 21/2362* (2011.01)
*H04N 21/61* (2011.01)
*H04N 21/462* (2011.01)

(52) U.S. Cl.
CPC ....... *H04N 21/2362* (2013.01); *H04N 21/4622* (2013.01); *H04N 21/6106* (2013.01)

(58) Field of Classification Search
CPC .................. H04N 21/4622; H04N 21/6106
USPC .................................... 725/116, 146
See application file for complete search history.

(56) References Cited

U.S. PATENT DOCUMENTS

2009/0217326 A1* 8/2009 Hasek ............................. 725/87
2014/0168512 A1* 6/2014 Suh et al. ........................ 348/441
2015/0007242 A1* 1/2015 Fay ............................... 725/116

FOREIGN PATENT DOCUMENTS

KR 1020010058884 A 7/2001
KR 1020120019754 A 3/2012
KR 1020120058700 A 6/2012

* cited by examiner

*Primary Examiner* — Pankaj Kumar
*Assistant Examiner* — Franklin Andramuno
(74) *Attorney, Agent, or Firm* — William Park & Associates Ltd.

(57) ABSTRACT

A method and apparatus for providing ultra high definition television service is provided. The apparatus for providing UHDTV service sets up a type of the UHDTV service as a first type of HDTV service and a second type different from that of the HDTV service in an environment of the UHDTV service and the HDTV service coexist.

20 Claims, 7 Drawing Sheets

FIG. 5

| stream content | component type | description |
|---|---|---|
| 0x05 | 0x11 | H.265/HEVC Ultra high definition video, 16:9 aspect ratio, 4K, 30Hz — 500 |
| 0x05 | 0x12 | H.265/HEVC Ultra high definition video, 16:9 aspect ratio, 4K, 60Hz — 510 |
| 0x05 | 0x13 | H.265/HEVC Ultra high definition video, 16:9 aspect ratio, 8K, 30Hz — 520 |
| 0x05 | 0x14 | H.265/HEVC Ultra high definition video, 16:9 aspect ratio, 8K, 60Hz — 530 |

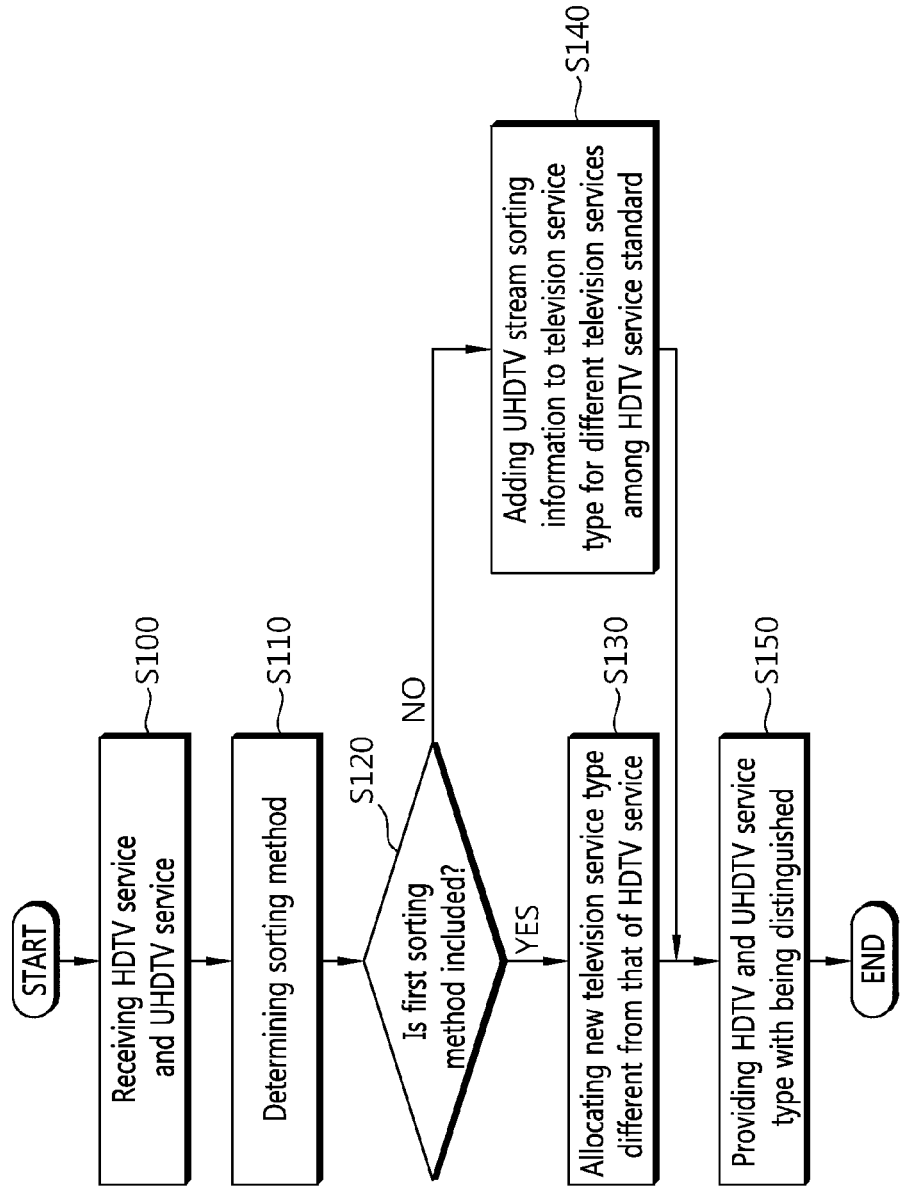

METHOD AND APPARATUS FOR PROVIDING ULTRA HIGH DEFINITION TELEVISION SERVICE

This application claims priority to Korean Patent Application No. 10-2013-0079679 filed on Jul. 8, 2013 and No. 10-2013-0083313 filed on Jul. 16, 2013 and No. 10-2014-0081703 filed on Jul. 1, 2014, the contents of which are herein incorporated by reference in its entirety.

BACKGROUND OF THE INVENTION

1. Field of the Invention

The present invention is related to a method and apparatus for providing ultra high definition television service and more particularly, to a method and an apparatus for providing the ultra high definition television service which can be provided by being distinguished from the high definition television service.

2. Discussion of the Related Art

Recently, as the high definition video services such as a digital television service, an internet, and the like are commonly used, the ultra high definition (UHD) video is emerged as a new service.

In the high definition television (HDTV) service which is provided in the digital broadcasting, the amount of data that corresponds to one program does not exceed one physical channel capacity which is provided from the corresponding transmission system. However, in the ultra high definition television service (hereinafter, referred as "UHDTV service"), whose resolution corresponds to 4 to 16 fold of that of the existing high definition television service as the television service of the next generation, the amount of data that corresponds to one program is significantly increased and exceeds one physical channel capacity.

Accordingly, the technique is required for providing to distinguish the digital television service which is transmitted by different service types and the UHDTV service.

PRIOR ART DOCUMENT

Patent Document (Patent document 1) Korean patent publication 2012-0019754 ("Receiving system for Digital Broadcasting using Ultrea High Definition module", Acetel corporation, published on Mar. 7, 2012)

SUMMARY OF THE INVENTION

An object of the present invention to solve the problem of described above is to provide a method and apparatus for the ultra high definition television service which can distinguishably provide the ultra high definition television service from the high definition television service.

The technical problems to solve are not limited to the technical problem to solve mentioned above, but other technical problems to solve which are not mentioned herein can be clearly understood by the description below.

According to an aspect of the present invention, an apparatus for providing UHDTV service comprises a television service sorting unit configured to set up a type of the UHDTV service as a first type of HDTV service and a second type different from that of the HDTV service in an environment of the UHDTV service and the HDTV service coexist.

The television service sorting unit includes a sorting method determining unit configured to determine determines at least one among a first sorting method that allocates a type of new television service which is different from the first type of the HDTV service and/or a second sorting method that adds a UHDTV stream distinguishing information to a third type for different television service except for the HDTV service among the standard of the HDTV service.

The television service sorting unit further includes a new TV service type allocating unit configured to set up the new television service type allocated according to the first sorting method which is received from the sorting method determining unit to a second type of the UHDTV service.

The new TV type allocating unit distinguishes a resolution of the UHDTV service, and allocates the new television service type to each resolution, respectively.

If the resolution of the UHDTV service is 4K, the new TV type allocating unit sets up the new television service type having a first value which is different from the value of the first type with the second type.

If the resolution of the UHDTV service is 8K, the new TV type allocating unit sets up the new television service type having a second value which is different from the value of the first type with the second type.

The new TV type allocating unit sets up the new television service type allocated to have a first value which is different from the value of the first type as the second type.

The new TV type allocating unit distinguishes at least one of resolution and scanning rate of the UHDTV service using the codec profile (HEVC profile) and/or level which is applied to a component descriptor (component_descriptor) of the UHDTV service in the new television service type.

The new TV type allocating unit distinguishes at least one of resolution and scanning rate of the UHDTV service by adding a format distinguishing information to a component descriptor loop of the UHDTV service in the new television service type.

The format distinguishing information includes at least one of a stream contents (stream_content) for distinguishing the contents of the video stream of the UHDTV service and a component type for distinguishing a signal format of the video stream.

The television service sorting unit further includes an adding unit configured to set up the third type as the second type of the UHDTV service by adding the UHDTV stream distinguishing information to the third type according to the second sorting method which is received from the sorting method determining unit.

The UHDTV stream distinguishing information includes at least one of a component type, a codec profile (HEVC profile) and a level.

According to another aspect of the present invention, a method for providing UHDTV service in an environment of the UHDTV service and the HDTV service coexist, comprises receiving the HDTV service and the UHDTV service; and setting up a type of the UHDTV service as a second type which is different from a first type different of the HDTV service.

The step of setting up the type of the UHDTV service includes: setting up a method for allocating a type of new television service which is different from the first type of the HDTV service as a first sorting method; and setting up a method for adding a UHDTV stream distinguishing information to a third type for different television service except for the HDTV service among the standard of the HDTV service as a second sorting method.

The step of setting up the type of the UHDTV service includes setting up the new television service type allocated according to the first sorting method to a second type of the UHDTV service.

The step of setting up to the second type includes: allocating unit distinguishes a resolution of the UHDTV service, and allocates the new television service type to each resolution, respectively; if the resolution of the UHDTV service is 4K, setting up the new television service type having a first value which is different from the value of the first type with the second type; and if the resolution of the UHDTV service is 8K, setting up the new television service type having a second value which is different from the value of the first type with the second type.

The step of setting up to the second type includes setting up the new television service type allocated to have a first value which is different from the value of the first type as the second type.

The step of setting up the new television service type as the second type includes: distinguishing at least one of resolution and scanning rate of the UHDTV service using the codec profile (HEVC profile) and/or level which is applied to a component descriptor (component_descriptor) of the UHDTV service in the new television service type; or distinguishing at least one of resolution and scanning rate of the UHDTV service by adding a format distinguishing information to a component descriptor loop of the UHDTV service in the new television service type.

The step of setting up the type of the UHDTV service includes setting up the third type as the second type of the UHDTV service by adding the UHDTV stream distinguishing information to the third type according to the second sorting method which is received from the sorting method determining unit.

The UHDTV stream distinguishing information includes at least one of a component type, a codec profile (HEVC profile) and a level.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 4 to FIG. 6 are drawings illustrating examples of the classification method for distinguishing the UHDTV service from the HDTV service by the television service sorting unit shown in FIG. 3.

FIG. 7 is a flow chart illustrating a method for providing ultra high definition television service according to an embodiment of the present invention.

DETAILED DESCRIPTION OF THE INVENTION

Figure 1:
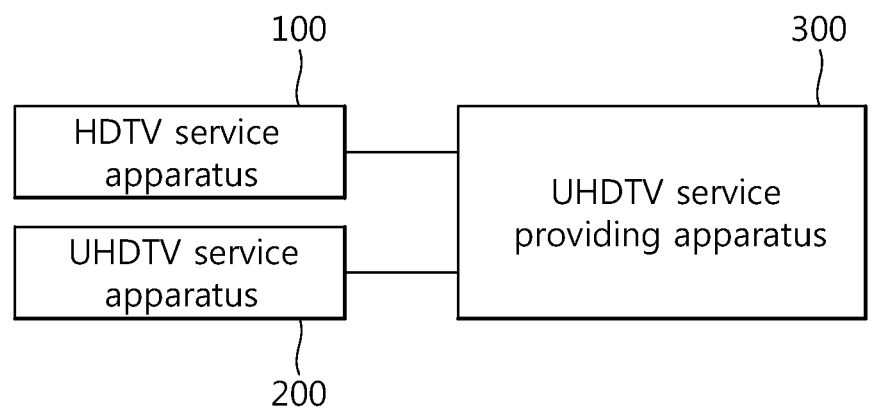
FIG. 1 is a drawing schematically illustrating the environment for providing the ultra high definition television service according to an embodiment of the present invention.

The specific embodiments of the present invention will now be described in detail by reference to the accompanying drawings, but the present invention may be modified or have various embodiments.

However, the present invention may be embodied in many different forms, modifications, equivalents and alternatives, which are included in the inventive concept and scope, and should not be construed as limited to the embodiments set forth herein.

Although the terms first, second, etc. may be used herein to describe various elements, it will be understood that these elements should not be limited by these terms. These terms are only used to distinguish one element from another. For example, a first element could be termed a second element, and similarly, a second element could be termed a first element without departing from the scope of the present invention. Herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening element present.

The terminology used herein is for the purpose of describing particular embodiments only and is not intended to be limiting of the present invention. As used herein, the singular forms are intended to include the plural forms as well, unless the context clearly indicates otherwise. It will be further understood that the terms "comprise" or "include" etc. when being used in this specification specify the presence of stated features, numbers, steps, operations, elements, components or combination of these things, but do not preclude the presence or addition of one or more other features, numbers, steps, operations, elements, components or combination of these things.

Unless otherwise defined, all terms including technical or scientific terms used herein have the same meaning as commonly understood by one of ordinary skill in the art to which the present invention belongs. It will be further understood that the terms such as those defined in commonly used dictionary should be interpreted as having a meaning that is consistent with their meaning in the context of the relevant art, and will not be interpreted in an idealized or overly formal sense unless expressly so defined herein.

The preferred embodiment of the present invention now will be described in detail by reference to the accompanying drawings. In order for the present invention to be easily understood in describing the present invention, the same reference numeral is used for the same element shown in the drawings, and the redundant description for the same element is omitted.

Figure 2:
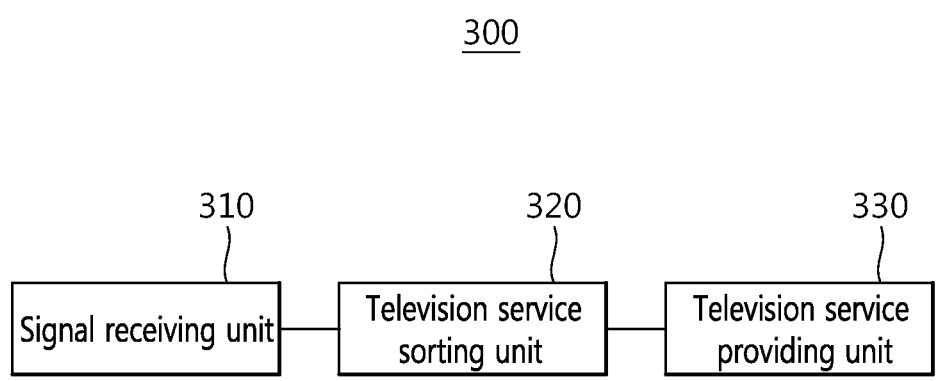
FIG. 2 is a block diagram schematically illustrating the apparatus for providing the ultra high definition television service shown in FIG. 1.

FIG. 1 is a drawing schematically illustrating the environment for providing the ultra high definition television service according to an embodiment of the present invention. FIG. 2 is a block diagram schematically illustrating the apparatus for providing the ultra high definition television service shown in FIG. 1.

As shown in FIG. 1, in the environment 10 for providing the ultra high definition television service according to an embodiment of the present invention, a HDTV service apparatus 100 transmits the high definition television service (hereinafter, referred to "HDTV service") to an ultra high definition television service providing apparatus 300 (hereinafter, referred to "UHDTV service providing apparatus"). And an UHDTV service apparatus 200 transmits the ultra high definition television service (hereinafter, referred to "UHDTV service") to the UHDTV service providing apparatus 300.

The UHDTV service providing apparatus 300 can be mounted on a receiving apparatus (not shown), and provide the television service by receiving it. In other words, the UHDTV service providing apparatus 300 receives the HDTV service from the HDTV service apparatus 100 based on the digital television channel. The UHDTV service providing apparatus 300 receives the UHDTV service from the UHDTV service apparatus 200 based on the digital television channel. The UHDTV service providing apparatus 300 performs separate signaling in order to distinguish the UHDTV service from the HDTV service and provides the result classified the UHDTV service from the HDTV service.

In particular, as shown in FIG. 2, the UHDTV service providing apparatus 300 includes a signal receiving unit 310, a television service sorting unit 320 and a television service providing unit 330.

The signal receiving unit 310 receives the HDTV service from the apparatus for providing the HDTV service 100. The signal receiving unit 310 receives the UHDTV service from the UHDTV service apparatus 200. The signal receiving unit 310 forwards the HDTV service and the UHDTV service to the television service sorting unit 320.

The television service sorting unit 320 receives the HDTV service and the UHDTV service from the signal receiving unit 310. In order to distinguish the UHDTV service from the HDTV service, the television service sorting unit 320 sets up the type of the television service by allocating a new television service type which is different from the HDTV service and/or adding the UHDTV stream distinguishing information that can be identified as the UHDTV service in the standard of the HDTV service. The television service sorting unit 320 generates the result of distinguishing the HDTV service and the UHDTV service, and forwards it to the television service providing unit 330.

The television service providing unit 330 receives the result of distinguishing television service from the television service sorting unit 320. The television service providing unit 330 provides by being distinguishing the UHDTV service from the HDTV service on the basis of the result of distinguishing television services.

Figure 3:
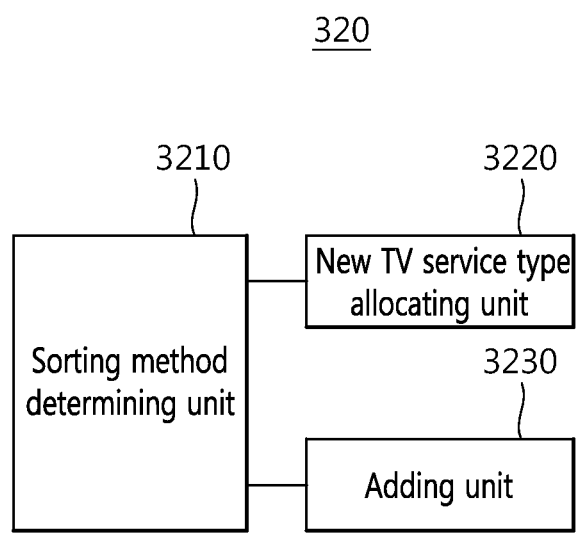
FIG. 3 is a block diagram schematically illustrating the television service sorting unit of the apparatus for providing the HDTV service shown in FIG. 2.
Figure 4:
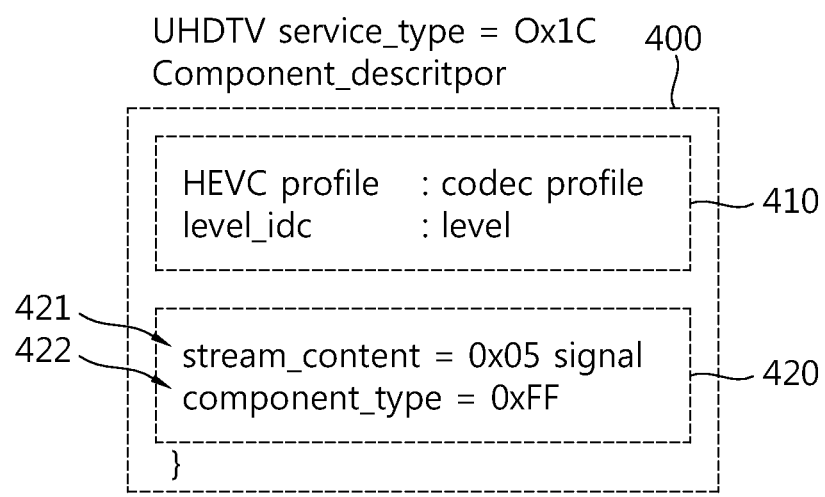
Figure 6:
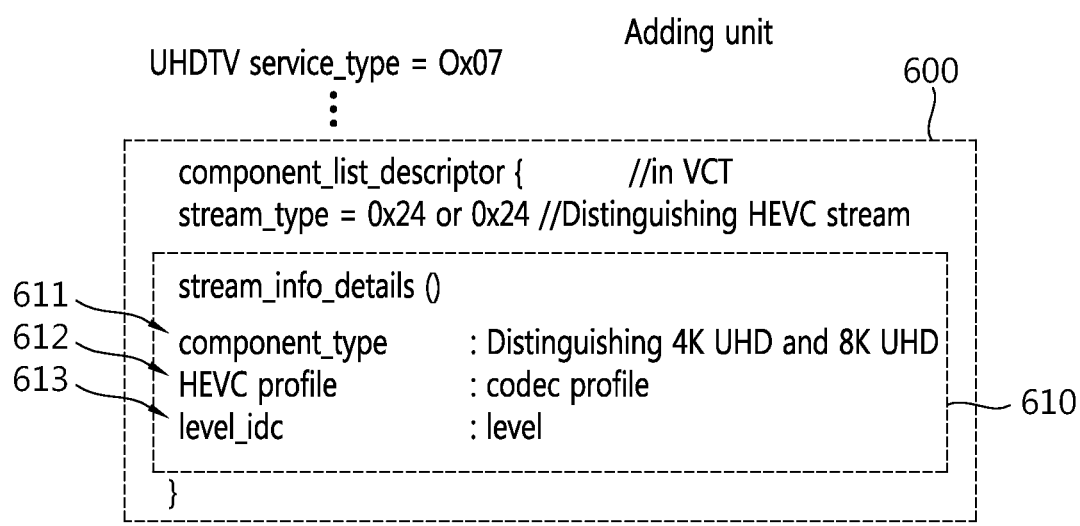

FIG. 3 is a block diagram schematically illustrating the television service sorting unit of the apparatus for providing the HDTV service shown in FIG. 2. FIG. 4 to FIG. 6 are drawings illustrating examples of the classification method for distinguishing the UHDTV service from the HDTV service by the television service sorting unit shown in FIG. 3.

Referring to FIG. 2 and FIG. 3, the television service sorting unit 320 of the UHDTV service providing apparatus 300 according to an embodiment of the present invention includes a sorting method determining unit 3210, a new TV service type allocating unit 3220 and an adding unit 3230.

The sorting method determining unit 3210 determines a sorting method in order to distinguish the UHDTV service from the HDTV service. Herein, the sorting method is defined as a first sorting method that allocates the type of new television services which is different from the type of the HDTV service and/or a second sorting method that adds a UHDTV stream distinguishing information to the television service type for different television service except for the HDTV service among the standard of the HDTV service. The sorting method determining unit 3210 generates a sorting execution message that includes the first and/or the second sorting method. And the sorting method determining unit 3210 forwards the sorting execution message to the new TV service type allocating unit 3220 and an adding unit 3230 in order for the first and/or second sorting method can be executed. The sorting method according to an embodiment of the present invention can be set up beforehand, and/or at least one sorting method may be properly selected based on the environment for providing the UHDTV service.

If the first sorting method is included in the sorting execution message, the new TV service type allocating unit 3220 allocates the type of new television services which is different from the type of the HDTV service according to the first sorting method.

Allocation of the Type of New Television Service Classified by Definition

As an example, if it is assumed that the type of HDTV service is allocated to "0x02" for the HDTV service, the new TV service type allocating unit 3220 distinguishes the resolution of the UHDTV service. Herein, the resolution of the UHDTV service includes 4K and 8K. The new TV service type allocating unit 3220 allocates new television service types classified by resolution of the UHDTV service. In other words, if the resolution is 4K, the new TV service type allocating unit 3220 allocates "0x10" as a new television service type which is different from "0x02", the type of the HDTV service, and sets up the new television service type with "0x10" as the type of the 4K UHDTV service. If the definition is 8K, the new TV service type allocating unit 3220 allocates "0x11" as a new television service type which is different from "0x02", the type of the HDTV service, and sets up the new television service type with "0x11" to the type of the 8K UHDTV service.

Allocation of a New Television Service

As another example, if it is assumed that the type of HDTV service is allocated to "0x02", the new TV service type allocating unit 3220 separately allocates a new television service type "0x1C" for the UHDTV service, as shown in FIG. 4. And the new TV service type allocating unit 3220 distinguishes the type of the video stream of the UHDTV service using the codec profile (HEVC profile)/level 410 which is applied to the component descriptor (component_descriptor) 400 of the UHDTV service in the new television service type "0x1C". That is, the new TV service type allocating unit 3220 distinguishes 4K and 8K which is the resolution of the UHDTV service using the profile and/or level 410 of the codec which is applied to the component descriptor 400, and distinguishes the scanning rate 30 fps and 60 fps of the UHDTV service.

Or, the new TV service type allocating unit 3220 adds the format distinguishing information 420 to the component descriptor 400 loop for distinguishing the type of the video stream of the UHDTV service after allocating new television service type "0x1C". Herein, the format distinguishing information 420 includes "stream contents (stream_content) 421 for distinguishing the contents of the video stream of the UHDTV service and "component type" 422 for distinguishing the signal format of the video stream, as shown in FIG. 5. Referring to FIG. 5, if the contents of the video stream of the UHDTV service is identical and the signal format of the video stream, that is, the resolution is 4K and the scanning rate is 30 fps, the new TV service type allocating unit 3220 allocates the value of the stream contents 421 to "0x05" in order for the video stream of the UHDTV service to be sorted as the first format 500—"H.265/HEVC Ultra high definition video, 16:9 aspect ratio, 4K, 30 Hz". Meanwhile, if the contents of the video stream of the UHDTV service is identical and the resolution is 4K and the scanning rate is 60 fps, the new TV service type allocating unit 3220 allocates the value of the stream contents 421 to "0x05" in order for the video stream of the UHDTV service to be sorted as the second format 510—"H.265/HEVC Ultra high definition video, 16:9 aspect ratio, 4K, 60 Hz", and allocates the value of the component type 422 to "0x12".

As the same way, if the contents of the video stream of the UHDTV service is identical and the resolution is 8K and the scanning rate is 30 fps, the new TV service type allocating unit 3220 allocates the value of the stream contents 421 to "0x05" in order for the video stream of the UHDTV service to be sorted as the third format 520—"H.265/HEVC Ultra high definition video, 16:9 aspect ratio, 8K, 30 Hz", and allocates the value of the component type 422 to "0x13". Meanwhile, if the contents of the video stream of the UHDTV service is identical and the resolution is 8K and the scanning rate is 60 fps, the new TV service type allocating unit 3220 allocates the value of the stream contents 421 to "0x05" in order for the video stream of the UHDTV service to be sorted as the fourth format 530—"H.265/HEVC Ultra high definition video, 16:9 aspect ratio, 8K, 60 Hz", and allocates the value of the component type 422 to "0x14".

Referring to FIG. 3 again, if the second sorting method is included in the sorting execution message, the adding unit 3230 adds the UHDTV stream distinguishing information to a television service type for different television service except for the HDTV service among the standard of the HDTV service according to the second sorting method. In other words, the type of the UHDTV service is set up by adding the UHDTV stream distinguishing information for the UHDTV service in "0x07" which is allocated for a television service different from the HDTV service in the HDTV service standard.

For example, as shown in FIG. 6, the adding unit 3230 adds the UHDTV stream distinguishing information that the UHDTV service type is allocated to "0x07" which was used for the HDTV service type. In other words, the adding unit 3230 adds the UHDTV stream distinguishing information 610 in the loop of the component list descriptor (component_list_descriptor) 600 of the UHDTV service. Herein, the UHDTV stream distinguishing information 610 includes a component type (component_type) 611, a codec profile (HEVC profile) 612 and a level 613. The component type 611 represents the resolution 4K and 8K of the UHDTV service with being distinguished. The codec profile 612 represents the profile used for the video compression way. The level 613 represents the video level which is defined by the HEVC standard for the codec video stream.

In the embodiment of the present invention, although the UHDTV stream distinguishing information is included in the component list descriptor 600, the present invention is not limited thereto, and may be independently used with not being included in a specific component descriptor.

FIG. 7 is a flow chart illustrating a method for providing ultra high definition television service according to an embodiment of the present invention. In FIG. 7, it is assumed and described that the sorting execution message includes at least one of the first sorting method or the second sorting method.

As shown in FIG. 7, the signal receiving unit 310 of the UHDTV service providing apparatus 300 receives the HDTV service from the HDTV service apparatus 100. The signal receiving unit 310 receives the UHDTV service from the UHDTV service apparatus 200 (step, S100). The signal receiving unit 310 forwards the HDTV service and the UHDTV service to the television service sorting unit 320.

The television service sorting unit 320 determines the sorting method by selecting either one of the first sorting method that allocates the type of new television services which is different from the type of the HDTV service or the second sorting method that adds a UHDTV stream distinguishing information to the television service type for different television service except for the HDTV service among the standard of the HDTV service in order to distinguish the UHDTV service from the HDTV service (step, S110). The sorting method determining unit 3210 generates the sorting execution message that includes the first sorting method or the second sorting method.

The television service sorting unit 320 determines whether the first sorting method is included in the sorting execution message (step, S120). As the result of determination of step, S120, if the first sorting method is included in the sorting execution message, the television service sorting unit 320 allocates a new television service type which is different from the HDTV service type according to the first sorting method (step, S130). Meanwhile, as the result of determination of step, S120, if the first sorting method is not included in the sorting execution message, the television service sorting unit 320 determines that the second sorting method is included in the sorting execution message. The television service sorting unit 320 adds the UHDTV steam distinguishing information for the UHDTV service to the television service type (for example, "0x07") allocated for the different television service except the HDTV service among the HDTV service standard, according to the second sorting method (step, S140). The television service sorting unit 320 generates the sorted results of the television service which is sorted between the HDTV service and the UHDTV service, and forwards it to the television service providing unit 330.

The television service providing unit 330 provides the UHDTV service from the HDTV service with being distinguished based on the sorted results of the television service (step, S150).

So far, the preferred embodiments of the present invention has been described by reference to the accompanying drawings, but this should not be interpreted to limit the scope of the present invention, and many modifications and variations may be made by those of ordinary skill in the art without departing from the spirit and scope of the present invention which is determined by the claims below.

What is claimed is:

1. An apparatus for providing UHDTV service, comprising:
   a television service sorting unit configured to set up a type of the UHDTV service as a first type of HDTV service and a second type different from that of the HDTV service in an environment of the UHDTV service and the HDTV service coexist, and
   a television service providing unit configured to receive from the television service sorting unit a result of distinguishing the HDTV service and the UHDTV service,
   wherein the television service sorting unit receives both the UHDTV service and the HDTV service based upon a same digital television channel.

2. The apparatus for providing UHDTV service of claim 1, wherein the television service sorting unit includes a sorting method determining unit configured to determine at least one among a first sorting method that allocates a type of new television service which is different from the first type of the HDTV service and/or a second sorting method that adds a UHDTV stream distinguishing information to a third type for different television service except for the HDTV service among the standard of the HDTV service.

3. The apparatus for providing UHDTV service of claim 2, wherein the television service sorting unit further includes a new TV service type allocating unit configured to set up the new television service type allocated according to the first sorting method which is received from the sorting method determining unit to a second type of the UHDTV service.

4. The apparatus for providing UHDTV service of claim 3, wherein the new TV type allocating unit distinguishes a resolution of the UHDTV service, and allocates the new television service type to each resolution, respectively.

5. The apparatus for providing UHDTV service of claim 4, if the resolution of the UHDTV service is 4K, wherein the new TV type allocating unit sets up the new television service type having a first value which is different from the value of the first type with the second type.

6. The apparatus for providing UHDTV service of claim 5, if the resolution of the UHDTV service is 8K, wherein the new TV type allocating unit sets up the new television service type having a second value which is different from the value of the first type with the second type.

7. The apparatus for providing UHDTV service of claim 3, wherein the new TV type allocating unit sets up the new television service type allocated to have a first value which is different from the value of the first type as the second type.

8. The apparatus for providing UHDTV service of claim 7, wherein the new TV type allocating unit distinguishes at least one of resolution and scanning rate of the UHDTV service using the codec profile (HEVC profile) and/or level which is applied to a component descriptor (component_descriptor) of the UHDTV service in the new television service type.

9. The apparatus for providing UHDTV service of claim 7, wherein the new TV type allocating unit distinguishes at least one of resolution and scanning rate of the UHDTV service by adding a format distinguishing information to a component descriptor loop of the UHDTV service in the new television service type.

10. The apparatus for providing UHDTV service of claim 9, wherein the format distinguishing information includes at least one of a stream contents (stream_content) for distinguishing the contents of the video stream of the UHDTV service and a component type for distinguishing a signal format of the video stream.

11. The apparatus for providing UHDTV service of claim 3, wherein the television service sorting unit further includes an adding unit configured to set up the third type as the second type of the UHDTV service by adding the UHDTV stream distinguishing information to the third type according to the second sorting method which is received from the sorting method determining unit.

12. The apparatus for providing UHDTV service of claim 11, wherein the UHDTV stream distinguishing information includes at least one of a component type, a codec profile (HEVC profile) and a level.

13. A method for providing UHDTV service in an environment of the UHDTV service and the HDTV service coexist, comprising:
  receiving the HDTV service and the UHDTV service;
  setting up a type of the UHDTV service as a second type which is different from a first type different of the HDTV service, and
  receiving by a television service providing unit a result of distinguishing the HDTV service and the UHDTV service,
  wherein both the UHDTV service and the HDTV service are based upon a same digital television channel.

14. The method for providing UHDTV service of claim 13, wherein setting up the type of the UHDTV service includes: setting up a method for allocating a type of new television service which is different from the first type of the HDTV service as a first sorting method; and setting up a method for adding a UHDTV stream distinguishing information to a third type for different television service except for the HDTV service among the standard of the HDTV service as a second sorting method.

15. The method for providing UHDTV service of claim 13, wherein setting up the type of the UHDTV service includes setting up the new television service type allocated according to the first sorting method to a second type of the UHDTV service.

16. The method for providing UHDTV service of claim 15, wherein setting up to the second type includes:
  allocating unit distinguishes a resolution of the UHDTV service, and allocates the new television service type to each resolution, respectively;
  if the resolution of the UHDTV service is 4K, setting up the new television service type having a first value which is different from the value of the first type with the second type; and
  if the resolution of the UHDTV service is 8K, setting up the new television service type having a second value which is different from the value of the first type with the second type.

17. The method for providing UHDTV service of claim 15, wherein setting up to the second type includes setting up the new television service type allocated to have a first value which is different from the value of the first type as the second type.

18. The method for providing UHDTV service of claim 17, wherein setting up the new television service type as the second type includes:
  distinguishing at least one of resolution and scanning rate of the UHDTV service using the codec profile (HEVC profile) and/or level which is applied to a component descriptor (component_descriptor) of the UHDTV service in the new television service type; or
  distinguishing at least one of resolution and scanning rate of the UHDTV service by adding a format distinguishing information to a component descriptor loop of the UHDTV service in the new television service type.

19. The method for providing UHDTV service of claim 14, wherein setting up the type of the UHDTV service includes setting up the third type as the second type of the UHDTV service by adding the UHDTV stream distinguishing information to the third type according to the second sorting method.

20. The method for providing UHDTV service of claim 14, wherein the UHDTV stream distinguishing information includes at least one of a component type, a codec profile (HEVC profile) and a level.

* * * * *